ALEXANDER F. METHERELL
INVENTOR.

BY Max Geldin

ATTORNEY

WAVEFRONT RECONSTRUCTION PROCESS AND SYSTEM

Filed May 14, 1969 2 Sheets-Sheet 2

INVENTOR.
ALEXANDER F. METHERELL
BY Max Geldin
ATTORNEY 3,606,518

WAVEFRONT RECONSTRUCTION PROCESS AND SYSTEM

Alexander F. Metherell, Newport Beach, Calif., assignor to McDonnell Douglas Corporation, Santa Monica, Calif.

Filed May 14, 1969, Ser. No. 824,399
Int. Cl. G02b *27/22;* G01s *9/66;* G01v *1/00*
U.S. Cl. 350—3.5 10 Claims

ABSTRACT OF THE DISCLOSURE

A new process for creating a hologram is disclosed which utilizes a computer to interpolate the phase of impinging radiation as between discrete transducers in an array and to calculate the location of lines of equal phase as between transducers of the waves of reconstructing radiation. A photographic record, equivalent to a diffraction grating, is created using the computer output and the record can be used as a hologram to generate real and virtual images.

The invention relates to the detection and identification of objects, an area of scene by means of coherent, substantially monochromatic radiation, and more particularly to apparatus and method for creating a hologram from acoustical radiation.

In the recently issued patent to Daniel Silverman, U.S. Pat. No. 3,400,363, there is described and shown apparatus for scanning or mapping the contour of three-dimensional objects or surfaces which may be hidden from direct optical view. The patent also is concerned with the utilization of the principles of "wavelet" reconstruction, for viewing an object or surface that can be irradiated with wave energy that is coherent in time and space, which object or surface can reflect and diffract the wave energy to what has been designated an "areal" array of detectors.

The patent teaches that the wave energy can be acoustic, elastic or electromagnetic (radar) in form and that the objects or surface can be immersed in any contrasting medium, such as water, earth, air or vacuum so long as it can reflect and diffract this energy. The patent then shows a plurality of detectors or transducers, all sensitive to the illuminating radiation. For each transducer, a corresponding, luminous source is arranged in substantially the same array with spacings which correspond, on a desired proportional scale, to the spacing of the transducers. The luminous output is modulated in accordance with the received radiation.

A photographic sheet or film can receive the pattern of light after being imaged by an appropriate optical system. The film or record will carry a pattern of transparent and opaque points or areas each representing a corresponding one of the detecting transducers. By the density or blackness at each point or area, the corresponding intensity of energy at the particular detector is represented and, overall, may be considered a standing wave pattern of intensity.

As noted in the patent, the photographic record created can then be considered a hologram and, if illuminated by coherent light, a real and/or virtual image of an object will become visible to the eye or can be photographed.

A corresponding system, primarily applicable to radar illumination has been disclosed in the patent to K. R. Ross, U.S. Pat. No. 3,284,799, which utilized a plurality of radar receivers, each controlling an electro-optic transducer which was disposed in the path of a coherent light beam. The resultant light output of the Ross system can be directly visualized by the observer or, through appropriate lens systems, the image can be projected.

There are many problems inherent in these prior art techniques which stem from the use of different frequencies of illuminating radiation and reconstructing radiation. These frequency or wave length differences usually result not only in scaling problems but also generally produce distortion in the images.

It would be desirable to utilize different illuminating and reconstructing frequencies, without distortion and without loss of resolution. Further, it would be desirable to provide more detail in a photographic record than can be achieved from the 1-to-1 correspondence of radiation transducers and points of luminosity, corresponding thereto.

According to the present invention, a transducer array is provided and, as in the above-mentioned patents, a signal, representing the relative phase and amplitude of impinging radiation at each transducer is provided. In a preferred embodiment, the array output is sampled by a computer and the phase and amplitude at each point is stored.

Utilizing the computer, the area bounded by a group of transducers, for example, three, is divided into areas of equal phase by determining the phase at each of the transducers and by calculating, through interpolation, the locations of the lines of equal phase within the area bounded by the transducers.

If the wave length ratio of the illuminating radiation to the reconstructing radiation is multiplied by the desired magnification (or demagnification) of the reconstructed image with respect to the original object, and the spacing between transducers is less than 1 wave length of the illuminating radiation, a factor representing the number of integral waves of reconstructing radiation that should exist in an illuminating wave length is generated.

The computer can then drive an appropriate luminous source such as a cathode ray tube to represent, on a screen, the area bounded by the three chosen transducers where the distance between the three chosen transducer points on the screen corresponds to the distance between the three transducer points on the detector array, multiplied by the desired magnification of reconstructed image with respect to the original object. Within this area, a plurality of light and dark parallel, straight lines can be provided respectively corresponding to the lines of 180° and 0° phase of the waves of reconstruction radiation which should exist, to represent accurately the object detected by the radiation impinging upon the three selected sensors. The screen can then be photographed as representing one of a plurality of cells in the array.

If now the remaining transducers in the array were each, successively, treated in corresponding groups of three and the light and dark "fringes" were generated in the computed display and photographed, it is possible to assemble either on a single sheet of film or from a plurality of sheets of film, a series of parallel, straight line, sinusoidal gratings, each corresponding to a cell, representative of and corresponding to the radiation impinging upon all of the sensors.

Through the use of the computer, the areas outside each group of three transducers or cell can also be displayed through interpolation techniques by regrouping the transducers into different cells for greater resolution. Since the area between adjacent groups of cells can thus be reconstructed, a substantially complete grating representing the complete area of the transducer array can be generated.

If now the luminous "grating" is utilized as a hologram in the conventional wave front reconstruction process, both real and virtual images of an object can be produced. The transducer array can then be considered the substantial equivalent of the sheet of photographic film which records the optical hologram, rather than an array of discrete points.

In alternative embodiments, the approach utilized in the preferred embodiment could be employed except that the conversion step which generates the plurality of "isophase" "light" and "dark" lines would not provide the equivalent number of waves at the higher, reconstructing frequency. Rather, the transducers are treated in groups to form cells and a luminous image is created of the "cell" with gradation of luminosity within the cell corresponding to the interpolated phase within the cell which merely represents the impinging radiation upon the array.

In the various embodiments, the transducer array can be considered as a group of discrete, noncontiguous cells in which each transducer is included in no more than one cell or, alternatively, the cells can either be partially contiguous with each transducer being included in more than one cell, or the cells can be completely contiguous so that the entire area corresponding to the transducer array could provide a luminous image, including the "light and dark fringes" that would exist, for example, if the irradiating frequency were in the visible range.

The invention will be more clearly understood by reference to the description below of certain embodiments of the invention, taken in connection with the accompanying drawings, wherein.

Figure 1:
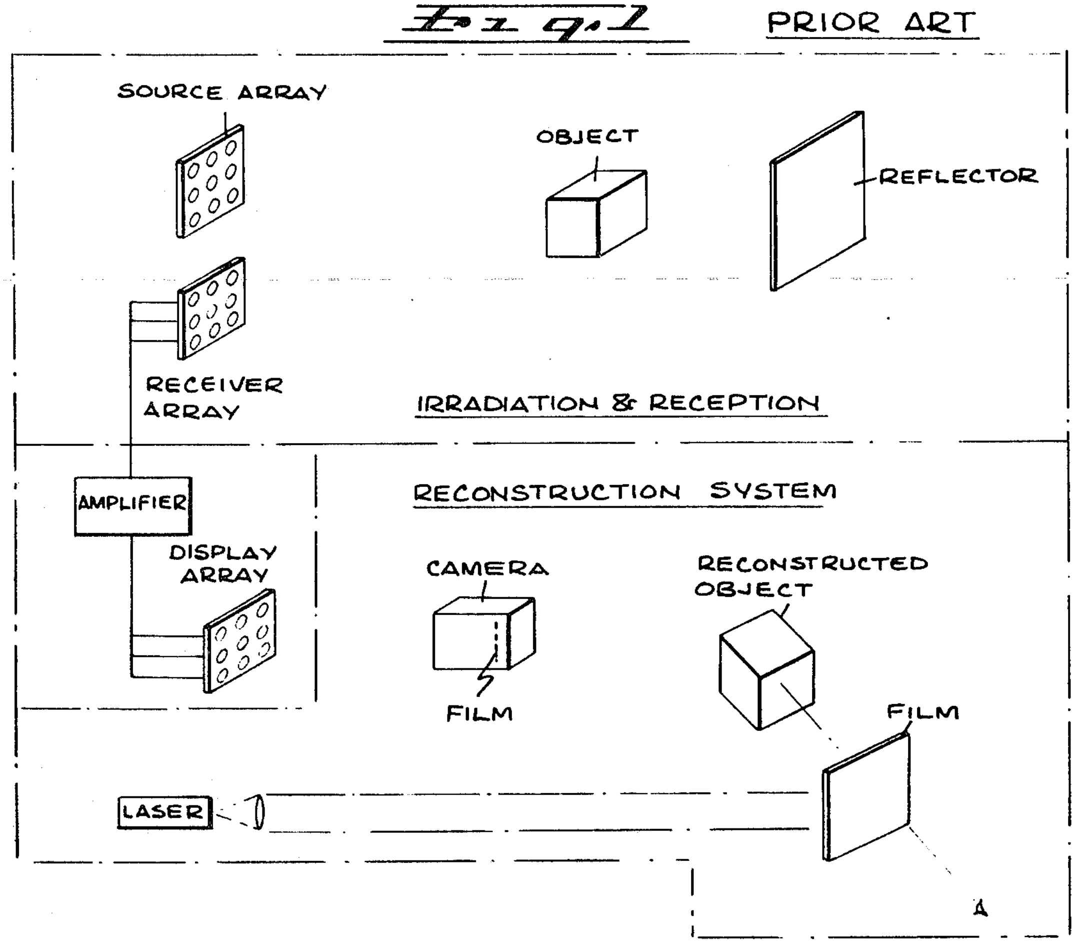
FIG. 1 PRIOR ART
FIG. 1 is illustrative of a prior art system of wavefront reconstruction of objects which have been illuminated by coherent radiation.

Turning first to FIG. 1, there is illustrated a typical prior art system such as is disclosed in the above-mentioned patent to Silverman, No. 3,400,363. As illustrated, for example, in FIG. 1 of that patent, a radiation source illuminates an object and a "receiver" array is positioned to detect radiation reflected from the object and, as shown, from a reflector.

The receiver array includes a plurality of discrete transducers arranged in a regularly spaced pattern or grid. Each of the receiving transducers is connected to a corresponding luminous source, a corresponding plurality of which is arranged in a similar array or grid, appropriately scaled with respect to the receiver array.

A camera system is arranged to permanently record on film the pattern of light from the display array or grid. After development, the film record, when inserted in a beam of coherent light, provides a reconstructed object. Alternatively, an image of the objects which can be photographed is provided.

In addition to the above-identified Silverman patent, a fairly complete description of the principles of wavelet construction with visible, coherent light has been published in the Scientific American of June 1965, volume 212, No. 6, in an article entitled "Photography by Laser."

It will be noted that the display array of Silverman is a plurality of luminous points. Intensity of luminosity at each point is directly related to the intensity of the impinging radiation on the corresponding transducer of the receiver array. In the examples in which a reference beam is used, the intensity at the transducer corresponds to the relative phase of the impinging radiation. If a reference beam is not used and "standing wave" interference patterns do not exist, then a reference beam must be supplied electronically and a sampling interval that is short relative to a cycle of radiant energy must be employed.

On film, each "point" source of luminosity can then act as a "new" source of coherent, reconstructing radiation. The plurality of "point" sources, arranged in the appropriate array, enables wavelet reconstruction as explained in the prior art.

Figure 2:
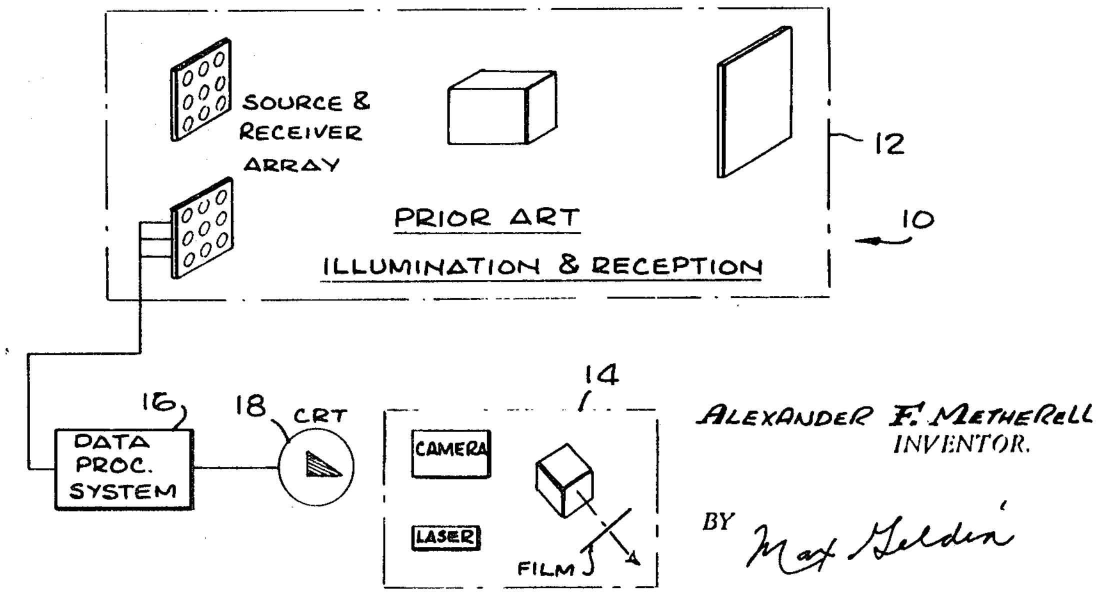
FIG. 2 is a block diagram of a system according to the present invention for providing a reconstruction of an object illuminated by coherent radiation.

Turning next to FIG. 2, there is shown a system 10 according to the present invention which may utilize as an illumination and reception subsystem 12, the prior art radiation source and receiver arrays. A reconstruction subsystem 14 could employ the prior art reconstruction system. However, interposed between the illumination and reception subsystem 12 and the reconstruction subsystem 14, there is inserted a data processing system 16 and a display device 18, which generates the luminous image that is subsequently recorded in the reconstruction subsystem 14.

Figure 3:
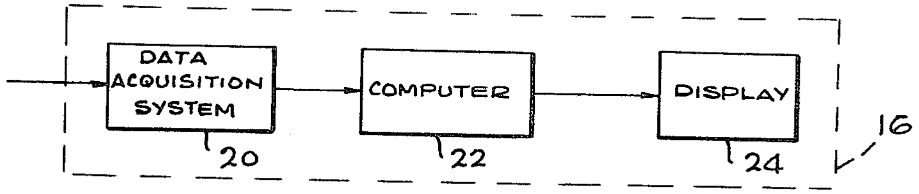
FIG. 3 is a block diagram of the data processing portion of the system of FIG. 2.

As shown in FIG. 3, the data processing system 16 may include a data acquisition system 20, a computer 22 and a display generator 24 which is coupled to drive the display device 18 of FIG. 2. The purpose of the data processing system 16 is to provide an output that is not merely representative of the energy impinging on each of the discrete transducers, but rather, to arrange the individual discrete transducers into groups or cells and to utilize the data processing system to reconstruct the radiation pattern within each cell by interpolation techniques. For example, the phase and intensity of the impinging radiation on each of the transducers defining a cell is sufficient to establish the phase gradient within the cell.

Figure 4:
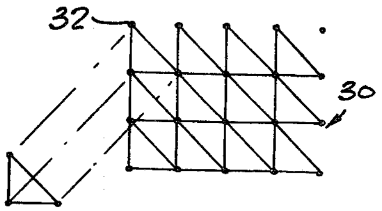
FIG. 4 is a representation of an array of receiving transducers.

With reference to FIG. 4, there is shown a rectangular array of transducers 30, which, in the present example includes some 20 transducers 32 in a 4 x 5 matrix array. For the purposes of the present example, a group of three transducers can be simultaneously considered as comprising a triangular cell. In one embodiment, the plurality of twenty transducers can be considered as a collection of 12 cells in a 4 x 3 array of triangular cells which are substantially non-contiguous, but in which adjacent cells share at least one transducer in common.

Other arrangements are possible in which adjacent cells share more than one transducer in common. Such an arrangement would permit more of the area of the transducer array to be "active" in the generation of a suitable display. By appropriate grouping of the various transducers, a "cell" structure can be designed which can enable the recreation of the entire radiation image that impinges on the entire transducer array.

Figure 5:
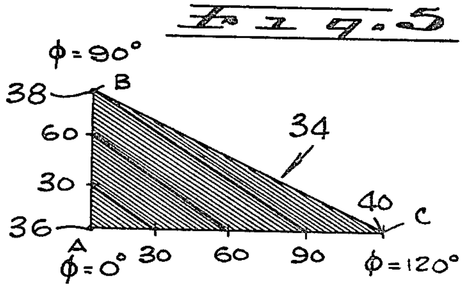
FIG. 5 is a representation of a single "cell" defined by a group of three individual transducers of the array of FIG. 4.

In FIG. 5, there is shown a representation of a single triangular cell of an array in which, for example, the phase of the impinging radiation has been measured to be 0° at transducer A, 36, 90° at transducer B, 38 and 120° at transducer C, 40. As noted in FIG. 5, the spacing between transducers A, 36 and C, 40 has been subdivided so that the points of 30° phase, 60° phase and 90° phase have been indicated. Similarly, the space between transducers A, and B, 36, 38, has been subdivided into points of 30° phase and 60° phase. The points of equal phase are joined by a line. Lines of equal phase or "isophase" lines, provide an indication of the nature of the wave front impinging upon the transducers.

In the preferred embodiment, the relative frequencies of the illuminating radiation and the reconstruction radiation must be considered as well as any magnification or demagnification that is to be achieved in the reconstruction of the object. If, for example, the ratio of frequency of the illuminating to reconstructing radiation is 1000 and the image is to be reduced in size by a factor of 2, then a factor of 500 would represent the number of waves or "fringes" of reconstructing radiation that should exist for each wave of illuminating radiation.

Accordingly, the phase angles in FIG. 5 could be multiplied by the factor of 500 so that, in FIG. 5, for example, the subdivisions would represent phase angles, not of 30°, 60°, 90° and 120°, but rather 15,000°, 30,000°, 45,000° and 60,000°.

If, in turn, the distance between the transducers is subdivided into intervals of 180°, some 333 points could be noted in the distance between points A and C some 250 points could be noted between points A and B. The resulting series of points then represent phases of 0° alternating with points of $\lambda/2$ relative phase.

The corresponding points of equal phase are then joined to form a parallel sinusoidal "grating." While it is primarily a matter of design choice, the 0° phase lines might be considered "light" while the 180° or $\lambda/2$ lines could be considered "dark." For the grating to be a sinusoidal grating the brightness of the points between the 0° phase lines and the 180° phase lines will be at grey levels determined as being a brightness that is proportional to the cosine of the phase angle.

If the grating within each cell is now calculated and photographed and the cells are arranged in the appropriate array, the finished plate will, in its simplest form, comprise a plurality of grating cells arranged in a rectangular array with opaque areas separating the individual cells. As more and more cells are used to make up the final plate and less and less area is unaccounted for, the plate will ultimately be equivalent to a photographic plate, intercepting the waves of illuminating radiation.

Since the angle of incidence of the reconstructing radiation must be taken into consideration, if it is desired to visually separate the reconstructed image from the zero order waves, the algorithm employed to generate the "fringes" must be modified accordingly so that non-parallel "fringes" can be generated.

Thus far, the system has been described in primarily functional terms and in terms of the results to be produced. It is clear that this system can be accomplished by using ordinary transducers and by manually preparing the various "cells" from the transducer outputs. It is also clear that electronic equipment exists to perform the same tasks.

Figure 6:
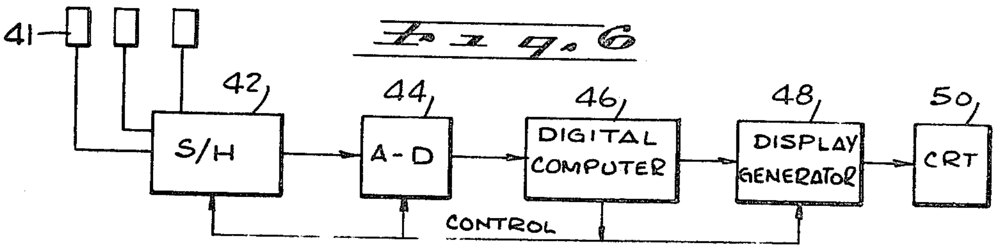
FIG. 6 is a block diagram of a data processing system suitable for use in the present invention.

Turning next to FIG. 6, there is shown, in block diagrammatic form, one of the many ways that the system according to the present invention can be mechanized. The individual transducers 41 of the receiver array are connected to a sample and hold network 42. The sample-hold network 42 includes an analog storage device for each of the transducers 41, and serves to staticize the contents of each transducer at any predetermined sampling time. Such an arrangement would be especially desirable in systems wherein the object is moving.

The contents of all of the transducers, which are "recorded" in parallel, can then be read out serially, through an A-to-D converter 44 into a digital computer 46. Depending upon the size and the capacity of the digital computer 46, the contents of the sample and hold network 42 can be transferred into the digital computer 46 on a "cell-by-cell" basis or can be "dumped." The computer 46 can then define each "cell" and determine the contents thereof.

Based upon the information received from the transducers 41 in digital form, the computer 46 can determine the phase of the impinging radiation at each of the transducers and can internally calculate the slope of the lines of equal phase. Depending, of course, upon the characteristics desired in the finished "hologram" and upon the angle of incidence to be employed in the reconstructing beam, the calculations can allow for these considerations in plotting the locations of the isophase lines and in generating the display. Further, it would be possible to also compute curved isophase lines if it is determined that curved, rather than straight fringes would more accurately represent the impinging radiation.

On a "cell-by-cell" basis, the computer 46 drives a display generator 48, which, in the preferred embodiment, is connected to a cathode ray tube 50, to provide a luminous output, corresponding to the lines of phase maxima and minima of the equivalent wave length corresponding to the reduced or magnified grating appropriate to the reconstructing frequency.

It is a trivial matter to generate on an appropriate CRT 50, a line having the slope corresponding to the calculated isophase lines. Given the slope, additional increments of bias in one of the orthogonal coordinates, permits the generation of a plurality of parallel lines of the same slope.

As is pointed out in the Scientific American article, the contrast rendition of the reconstructed image is substantially independent of the contrast properties of the photographic emulsion in producing the hologram. As a result, failure to preserve a proper gray scale does not affect the reconstructed image. Accordingly, the use of a CRT in its conventional way, producing a plurality of parallel, luminous lines separated by "dark" lines, would be adequate to create a photographic hologram.

Figure 7:
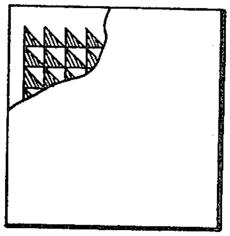
FIG. 7 shows a portion of a photographic transparency which has recorded the images of a plurality of cells from the display device.
Figure 8:
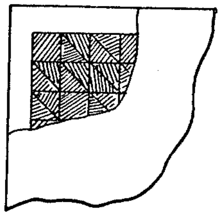
FIG. 8 is the illustration of a transparency of the output displays of a plurality of cells in a different configuration, which encompasses the entire area of the transducer array.

FIGS. 7 and 8 illustrate alternative holograms that can be produced, depending upon the selection of a "cell" size and cell location. As noted in FIG. 7, each cell may be considered a right triangle with each transducer being shared by three adjacent touching triangles. In FIG. 7, adjacent cells are separated by a complementary area, equal to a cell, in which no image is recorded. Approximately one-half of the available information is thus displayed.

FIG. 8, on the other hand, utilizes triangular cells which are substantially contiguous and includes complementary right triangular cells adjacent each of the cells of FIG. 7. The finished hologram therefore represents the information content of the entire transducer array.

In alternative embodiments, it may be desirable to omit the step of multiplying by a factor appropriate to the frequency of the reconstructing radiation, utilizing only the phase information at the frequency of the illuminating radiation. In such an embodiment, the present invention still provides results superior to that furnished by the prior art systems as described above.

Figure 9:
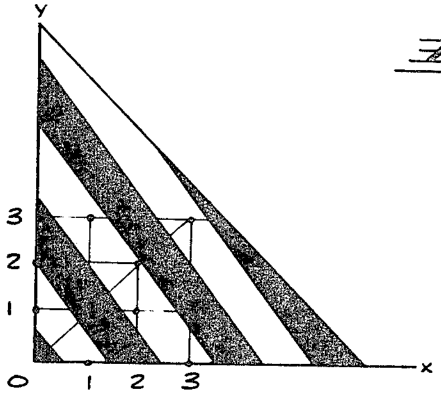
FIG. 9 is a representation of the display provided by a CRT, representing the calculated sinusoidal grating within the area of a single cell.

More particularly, as shown in FIG. 9, a "coarse" grating can be generated taking advantage of the system insensitivity to gray scale fidelity. As illustrated in FIG. 9, some 16 points in an orthogonal grid are shown, representing the corresponding location of 16 transducers which are placed less than one wave length apart.

FIG. 9 would represent the composite, output hologram generated by interpolating the lines of equal phase existing within the area bounded by the 12 peripheral transducers. Assuming that the transducer at 0, 0 (in X, Y coordinates) signals a "dark" maximum, the other trandsucers in the grid can signal the phase relative to the OP transducers. The light and dark lines representing the instantaneous "image" of the wave front impinging upon the transducer array is generated as a binary output of either dark or light.

It can then be seen, that, unlike the systems of the prior art, the hologram is not made up of an image comprising the relative luminosity of each point corresponding to a transducer, but, rather, a representation is provided of the energy impinging on the entire array.

It is understood that as each "cell" is generated on the CRT 50, the image of the cell must be appropriately located with respect to the photographic film which is to be the hologram or grating. This selective positioning of successive images may be accomplished by relocating the image with respect to the face of the CRT 50, may be accomplished through an appropriate optical system, or, alternatively, may result from a selective repositioning of the photographic film after the image of each cell has been recorded.

A simple modification to the display electronics, of course, would enable the display of FIG. 9 to be generated as a true sinusoid if the electron gun was suitably modulated by a sinusoidally varying signal. Such a result is difficult to illustrate in patent drawings, because of Patent Office requirements. However, such a display is deemed desirable in the generation of holograms.

Figure 10:
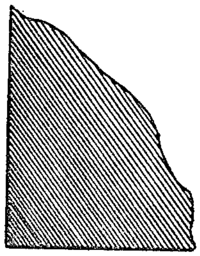
FIG. 10 is a representation of a portion of a display, magnified to illustrate the multiplicity of parallel lines that "should" exist.

Turning finally to FIG. 10, there is shown a portion of the CRT display of a part only of a cell. The scale has been greatly expanded so that a preferred display could be illustrated. However, it is to be understood that FIG. 10 is only exemplary and slightly idealized. A plurality of parallel lines have been shown which comprise the grating. While the grating is shown as alternating black and white lines, it is to be understood that a sinusoidal variation from dark to light is intended. Moreover, it is to be understood that the present drawings are illustrative only and do not purport to be an accurate representation of holograms which can be produced according to the present invention.

Thus there has been described and illustrated a method and system for producing a "hologram" which, using wave front reconstructing techniques, can be used to generate a real or virtual image of an object. The "hologram" is generated by interpolating the phase gradient of impinging illuminating radiation upon a network of discrete transducers by determining the instantaneous phase at each transducer and calculating the phase gradient between adjacent transducers. The determination of "instantaneous phase" can be accomplished through the use of a reference beam, frequency mixing, or, sampling or strobing techniques. Once the phase gradient is known, isophase lines can be computed and, in an appropriate display device, luminous and dark lines corresponding to amplitude maxima and minima of the impinging, illuminating radiation can be generated. Since phase reversals do not affect the information content, the representation of zero phase by light or dark is a matter of design choice.

I claim:

1. A system of forming a real and virtual image of an object comprising: first means for illuminating the object with coherent radiation; second means for receiving a portion of the illuminating radiation from the object, including an array of discrete transducers, each being operable to signal the relative phase of radiation impringing thereon; third means connected to said second means for calculating the phase gradient as between adjacent transducers, calculating the relative location of isophase lines as between adjacent transducers, arranging groups of adjacent transducers into an arbitrary cell structure, and determining the relative locations of isophase lines within each such cell; fourth means connected to said third means for displaying, on a cell-by-cell basis, a luminous representation of each cell and the isophase lines within each cell; fifth means, responsive to the luminous representation of said fourth means for forming a photographic record of each such cell in a relative location corresponding to the relative location of each arbitrary cell within said array of discrete transducers; and sixth means for utilizing the composite record as a hologram in a wave front reconstruction system for producing a real and virtual image of the illuminated object.

2. The system of claim 1, above, in which said fourth means include means for modulating said fourth means whereby said luminous representation of isophase lines is a sinusoidal variation as between bright and dark.

3. The system of claim 1 in which said third means include means for modifying the calculated phase gradient by converting to an equivalent gradient for the wave length of the reconstructing radiation frequency utilized in said sixth means; and wherein said fourth means include means for generating luminous isophase lines representative of the calculated gradient as modified to represent the reconstruction radiation frequency.

4. The system of claim 3 above, wherein said third means further include means for compensating for change of scale of image by further modifying the calculated phase gradient by a factor representing the scale change as between the object and the desired scale of the reconstructed real and virtual images.

5. The system of claim 3, above, wherein said fifth means further include means for changing the scale of image by modifying the size of the record, relative to the size of said luminous representation.

6. The method of forming a real and virtual image of an object comprising the steps of: illuminating the object with coherent radiation; receiving a portion of the illuminating radiation from the object by an array of discrete transducers; determining the relative phase of impinging radiation at each of the transducers of the array; calculating the phase gradient as between adjacent transducers; calculating the relative location of isophase lines as between adjacent transducers; arranging groups of adjacent transducers into an arbitrary cell structure and determining the relative locations of isophase lines within each such cell; displaying, on a cell-by-cell basis, a luminous representation of each cell and the isophase lines within each cell; forming a photographic record of each such cell; arranging the photographic record of each such cell to correspond it to the location of each such cell within the array of discrete transducers; and utilizing the composite record as a hologram in a wave front reconstruction system to produce a real and virtual image of the illuminated object.

7. The method of claim 6, above, in which the displaying step represents the isophase lines as a sinusoidal variation of bright and dark.

8. The method of claim 6 in which the calculating step further includes the step of modifying the calcuated phase gradient by converting to an equivalent gradient for the wave length corresponding to the reconstructing radiation frequency in the wave front reconstruction step; and wherein said display step includes the generation of isophase lines representative of the calculated gradient modified to represent the reconstruction radiation frequency.

9. The method of claim 8, above, wherein the calculating step further includes compensating for change of scale of image by further modifying the calculated gradient by a factor representing the scale change as between the object and the desired scale of the reconstructed real and virtual images.

10. The method of claim 8, above, wherein the calculating and forming steps further include modifiying the cell size on the photographic record for changing the scale of the image.

References Cited

UNITED STATES PATENTS 3,400,363 9/1968 Silverman ........ 350—3.5UX

OTHER REFERENCES

Lesem et al., Communications of the Acm, vol. 11, No. 10, pp. 661–674 (October 1968).

DAVID SCHONBERG, Primary Examiner

R. L. SHERMAN, Assistant Examiner

U.S. Cl. X.R.

181—0.5R; 340—1R